(12) United States Patent
Chang et al.

(10) Patent No.: US 8,781,022 B1
(45) Date of Patent: Jul. 15, 2014

(54) METHODS FOR MULTI-LEVEL DATA TRANSMISSION

(71) Applicant: AU Optronics Corporation, Hsinchu (TW)

(72) Inventors: Rung-Yuan Chang, Hsinchu (TW); Chun-Fan Chung, Hsinchu (TW)

(73) Assignee: AU Optronics Corporation, Hsinchu (TW)

( * ) Notice: Subject to any disclaimer, the term of this patent is extended or adjusted under 35 U.S.C. 154(b) by 0 days.

(21) Appl. No.: 13/782,157

(22) Filed: Mar. 1, 2013

(51) Int. Cl.
*H04L 25/34* (2006.01)

(52) U.S. Cl.
USPC ........................................... 375/286; 375/295

(58) Field of Classification Search
USPC ................... 375/260, 286, 295, 265
See application file for complete search history.

(56) References Cited

U.S. PATENT DOCUMENTS

| | | | |
|---|---|---|---|
| 4,489,417 A | 12/1984 | Askin et al. | |
| 4,910,750 A | 3/1990 | Fisher | |
| 5,166,956 A | 11/1992 | Baltus et al. | |
| 6,114,979 A | 9/2000 | Kim | |
| 7,206,876 B2 | 4/2007 | Jang | |
| 2009/0051675 A1 | 2/2009 | Huang | |
| 2009/0077431 A1* | 3/2009 | Zheng | 714/701 |
| 2011/0102208 A1 | 5/2011 | Terashima | |
| 2013/0086457 A1* | 4/2013 | Mittelholzer et al. | 714/806 |
| 2013/0227380 A1* | 8/2013 | Mittelholzer et al. | 714/807 |
| 2014/0016724 A1* | 1/2014 | Cronie et al. | 375/296 |

FOREIGN PATENT DOCUMENTS

| | | |
|---|---|---|
| CN | 103118251 A | 5/2013 |
| GB | 1382975 A | 2/1975 |
| JP | S62204332 A | 9/1987 |

OTHER PUBLICATIONS

State Intellectual Property Office of the P. R. China, "International Search Report and Written Opinion for PCT/CN2013/080274", China, Nov. 21, 2013.

\* cited by examiner

*Primary Examiner* — Emmanuel Bayard
(74) *Attorney, Agent, or Firm* — Morris, Manning & Martin, LLP; Tim Tingkang Xia, Esq.

(57) ABSTRACT

A method for multi-level data transmission includes encoding a data signal to be transmitted into N multi-level signals in accordance with an encoding table, where the data signal is characterized with a stream of binary data segments each of which has a data length of M bits, transmitting simultaneously the N multi-level signals through N data transmission channels, respectively; and decoding the N multi-level signals into the data signal by comparing each two of the N multi-level signals transmitted through the two data transmission channels to obtain a respective bit of the M bits of each binary data segment of the data signal based on comparison between the two corresponding multi-level signals.

21 Claims, 11 Drawing Sheets

| ENCODING TABLE | | | | | DECODING TABLE | | |
|---|---|---|---|---|---|---|---|
| DEC | BIN | A | B | C | A-B | B-C | C-A |
| 0 | 00 | -1 | 0 | 1 | 0 | 0 | 1 |
| 1 | 01 | -1 | 1 | 0 | 0 | 1 | 1 |
| 2 | 10 | 1 | -1 | 0 | 1 | 0 | 0 |
| 3 | 11 | 1 | 0 | -1 | 1 | 1 | 0 |
| Command#1 | | 0 | 1 | -1 | 0 | 1 | 0 |
| Command#2 | | 0 | -1 | 1 | 1 | 0 | 1 |

FIG. 1

| ENCODING TABLE | | | | | | | | DECODING TABLE | | | | | | |
| --- | --- | --- | --- | --- | --- | --- | --- | --- | --- | --- | --- | --- | --- | --- |
| | | | | | | | | Data | | | Polarity | | | |
| Polarity | DEC | BIN | A | B | C | D | | A·B | A·C | A·D | B·C | B·D | C·D | XOR |
| even | 0 | 000 | 3 | -1 | 1 | -3 | | 1 | 1 | 1 | 0 | 1 | 1 | 0 |
| odd | 0 | 000 | -3 | 1 | -1 | 3 | | 0 | 0 | 0 | 1 | 0 | 0 | 1 |
| even | 1 | 001 | 1 | -3 | -1 | 3 | | 1 | 1 | 0 | 0 | 0 | 0 | 0 |
| odd | 1 | 001 | -1 | 3 | 1 | -3 | | 0 | 0 | 1 | 1 | 1 | 1 | 1 |
| even | 2 | 010 | 1 | -1 | 3 | -3 | | 1 | 0 | 1 | 0 | 1 | 1 | 0 |
| odd | 2 | 010 | -1 | 1 | -3 | 3 | | 0 | 1 | 0 | 1 | 0 | 0 | 1 |
| even | 3 | 011 | -1 | -3 | 1 | 3 | | 1 | 0 | 0 | 0 | 0 | 0 | 0 |
| odd | 3 | 011 | 1 | 3 | -1 | -3 | | 0 | 1 | 1 | 1 | 1 | 1 | 1 |
| even | 4 | 100 | 1 | 3 | -3 | -1 | | 0 | 1 | 1 | 1 | 1 | 0 | 0 |
| odd | 4 | 100 | -1 | -3 | 3 | 1 | | 1 | 0 | 0 | 0 | 0 | 1 | 1 |
| even | 5 | 101 | -1 | 3 | -3 | 1 | | 0 | 1 | 0 | 1 | 0 | 0 | 0 |
| odd | 5 | 101 | 1 | -3 | 3 | -1 | | 1 | 0 | 1 | 0 | 1 | 1 | 1 |
| even | 6 | 110 | -1 | 1 | 3 | -3 | | 0 | 0 | 1 | 0 | 1 | 1 | 0 |
| odd | 6 | 110 | 1 | -1 | -3 | 3 | | 1 | 1 | 0 | 1 | 0 | 0 | 1 |
| even | 7 | 111 | -3 | -1 | 1 | 3 | | 0 | 0 | 0 | 0 | 0 | 0 | 0 |
| odd | 7 | 111 | 3 | 1 | -1 | -3 | | 1 | 1 | 1 | 1 | 1 | 1 | 1 |

FIG. 6

METHODS FOR MULTI-LEVEL DATA TRANSMISSION

FIELD OF THE INVENTION

The invention generally relates to data transmission, and more particularly to methods and systems that utilize multiple multi-level signals to transmit a binary data signal.

BACKGROUND OF THE INVENTION

In recent years, display technology has rapidly developed to satisfy the consumer needs, such as three-dimensional (3D) video imaging, digital cinema resolution, or smart TV that combines regular TV and the Internet. To achieve the requirements of high resolution and high amplitude velocity image, data transmission is critical for the increasingly huge amount of image data being transferred. However, with the requirement of compact-sized products of the display panel, circuitry design on the panel is limited, which affects the transmission quality.

Generally, with a huge amount of data to be transferred, the data can be encoded to increase the bandwidth of data transmission. A typical way of high speed data transmission is to convert the data to be transmitted to encoded multi-level signals. Thus, transmission of the encoded multi-level signals would be more efficient than transmission of the original data. For example, a data with the length of two bits can be encoded or converted to a quaternary level signal, which refers to a signal with 4 different levels. Thus, transmission of the quaternary level signal would be more efficient than transmission of the two bits of the original data. When the receiving terminal receives the quaternary level signal, it can be decoded to obtain the original data with the two bits.

When the encoded multi-level signals are used for data transmission, however, it is difficult to determine each signal level of the multi-level signals. For example, if data with the length of two bits is encoded to the quaternary level signal, which has four different signal levels, the signal stream of the quaternary level signals has no reference to the four different signal levels, and errors may occur if the decoder misjudges one of the signal levels to another. Thus, additional reference voltage can be provided as the reference signal for the multi-level signals, which increases the complexity of the circuitry design.

Further, when encoded multi-level signals are used for data transmission, mapping (encoding and decoding) of the data generally would be one-to-one correspondence. For example, each of the four different signal level of a quaternary level signal corresponds to one of the four combinations of a data with two bits. However, the one-to-one correspondence leaves no space for other command signals, such as clock signaling information, to be transmitted along with the encoded data stream. Thus, additional signals are required for these commands, which increase the complexity of the circuitry design.

Therefore, a heretofore unaddressed need exists in the art to address the aforementioned deficiencies and inadequacies.

SUMMARY OF THE INVENTION

The present invention, in one aspect, relates to a method for high speed multi-level data transmission. In one embodiment, the method includes the step of encoding a data signal to be transmitted into first, second and third ternary signals in accordance with an encoding table. The data signal is characterized with a stream of binary data segments each of which has a data length of two bits comprising a first bit and a second bit, thereby corresponding to one of four binary permutations of the first and second bits. The first, second and third ternary signals are configured such that each of the first, second and third ternary signals has three signal levels, and at the same time each of the first, second and third ternary signals has a signal level different from that of the other two of the first, second and third ternary signals, whereby the signal levels of the first, second and third ternary signals have six ternary permutations. In one embodiment, the three signal levels of each of the first, second and third ternary signals comprise a positive level, a zero level, and a negative level, and wherein a cumulative signal level of the first, second and third ternary signals is zero.

The encoding table is defined such that four of the six ternary permutations of the first, second and third ternary signals are assigned corresponding to the four binary permutations of the data signal, respectively, and the other two of the six ternary permutations of the first, second and third ternary signals are assigned corresponding to first and second command codes, respectively.

In one embodiment, the encoding step comprises the steps of converting the data signal into the stream of binary data segments each of which has the data length of two bits comprising the first bit and the second bit, and mapping the stream of binary data segments onto the first, second and third ternary signals in accordance with the encoding table.

Additionally, the method also includes the step of transmitting the stream of binary data segments in the form of the first, second and third ternary signals simultaneously and respectively through first, second and third data transmission channels such that when two consecutive binary data segments are identical, a second binary data segment of the two consecutive binary data segments is replaced with one of the first and second command codes.

Further, the method includes the step of decoding the transmitted first, second and third ternary signals to obtain the data signal. In one embodiment, the decoding step comprises the step of comparing each two of the transmitted first and second ternary signals, performed with three comparators coupled to the first, second and third data transmission channels. In one embodiment, the comparing step comprises the steps of comparing the transmitted first and second ternary signals to obtain the second bit of each binary data segment of the data signal, and comparing the transmitted second and third ternary signal to obtain the first bit of each binary data segment of the data signal.

In one embodiment, the decoding step further comprises the step of obtaining a clock signal, performed with a logic circuit.

In another embodiment, wherein the decoding step further comprises the steps of obtaining a signal for latch data.

In another aspect, the present invention relates to a method for high speed multi-level data transmission. In one embodiment, the method includes the step of encoding a data signal to be transmitted into N multi-level signals in accordance with an encoding table.

The data signal is characterized with a stream of binary data segments each of which has a data length of M bits comprising a first, second, . . . , and M-th bits, M, N being integers, N>2, M≥2, and N!>$2^M$, wherein each stream of binary data segment is corresponding to one of $2^M$ binary permutations of the first, second, . . . , and M-th bits.

The N multi-level signals are configured such that each multi-level signals has N signal levels, and at the same time each multi-level signal has a signal level different from that of the other (N−1) multi-level signals, whereby the signal levels of the N multi-level signals have P(N, N)=N! multi-level permutations.

The encoding table is defined such that $2^M$ multi-level permutations of the N! multi-level permutations of the N multi-level signals are assigned corresponding to the $2^M$ binary permutations of the data signal, respectively, and the other multi-level permutations are assigned corresponding to command codes, respectively.

The method also includes the step of transmitting the stream of binary data segments in the form of the N multi-level signals simultaneously and respectively through first, second, . . . , N-th data transmission channels such that when two consecutive binary data segments are identical, a second binary data segment of the two consecutive binary data segments is replaced with one of the command codes.

The method further includes the step of decoding the N multi-level signals to obtain the data signal, where the decoding step comprise the step of comparing each two of the N multi-level signals transmitted through the two data transmission channels to obtain a respective bit of the M bits of each binary data segment of the data signal based on comparison between the two corresponding multi-level signals.

In yet another aspect, the present invention relates to a method for high speed multi-level data transmission. In one embodiment, the method includes the step of encoding a data signal to be transmitted into first, second, third and fourth quaternary signals in accordance with an encoding table.

The data signal is characterized with a stream of binary data segments each of which has a data length of three bits comprising a first bit, a second bit and a third bit, thereby corresponding to one of eight binary permutations of the first, second and third bits. The first, second, third and fourth quaternary signals are configured such that each of the first, second, third and fourth quaternary signals has four signal levels, and at the same time each of the first, second, third and fourth quaternary signals has a signal level different from that of the other three of the first, second, third and fourth quaternary signals, whereby the signal levels of the first, second, third and fourth quaternary signals have twenty-four quaternary permutations.

The encoding table is defined such that each of eight binary permutations of the data signal is mapped into a respective pair of quaternary permutations of the twenty-four quaternary permutations of the first, second, third and fourth quaternary signals, wherein each signal level in one of the respective pair of quaternary permutations, named as an odd quaternary permutation, is opposite to its corresponding signal level in the other of the respective pair of quaternary permutations, named as an even quaternary permutation.

In one embodiment, the other eight of the twenty-four quaternary permutations of the signal levels of the first, second, third and fourth quaternary signals are adapted as command codes.

In one embodiment, the encoding step comprises the steps of converting the data signal into the stream of binary data segments each of which has the data length of three bits comprising the first, second and third bits, and mapping the stream of binary data segments onto the first, second, third and fourth quaternary signals in accordance with the encoding table.

The method also includes the step of transmitting the stream of binary data segments in the form of the first, second, third and fourth quaternary signals simultaneously and respectively through first, second, third and fourth data transmission channels such that when a binary data segment occurs in a (2K+1)-th time, the odd quaternary permutation of its respective pair of quaternary permutations is transmitted, when the binary data segment occurs in a (2K)-th time, the even quaternary permutation of its respective pair of quaternary permutations is transmitted, thereby achieving a DC balance, wherein K is an integer greater than or equal to zero.

The transmitted first, second, third and fourth quaternary signals are then decoded to obtain the data signal. In one embodiment, the decoding step further comprises the steps of comparing the transmitted first and second quaternary signals to obtain the first bit of each binary data segment of the data signal, comparing the transmitted first and third quaternary signals to obtain the second bit of each binary data segment of the data signal, and comparing the transmitted first and fourth quaternary signals to obtain the third bit of each binary data segment of the data signal.

The decoding step further comprises the step of obtaining a clock signal, performed with a logic circuit. In one embodiment, the step of obtaining the clock signal comprises the steps of comparing the transmitted second and third quaternary signals to obtain a first intermediate bit, comparing the transmitted second and fourth quaternary signals to obtain a second intermediate bit, comparing the transmitted third and fourth quaternary signals to obtain a third intermediate bit, and performing an exclusive-or (XOR) operation to the first, second and third intermediate bits to obtain the clock signal.

In a further aspect, the present invention relates to a method for high speed multi-level data transmission. In one embodiment, the method includes the step of encoding a data signal to be transmitted into N multi-level signals in accordance with an encoding table.

The data signal is characterized with a stream of binary data segments each of which has a data length of M bits comprising a first, second, . . . , and M-th bits, M, N being integers, N>2, M≥2, and N!≥2*($2^M$), wherein each stream of binary data segment is corresponding to one of $2^M$ binary permutations of the first, second, . . . , and M-th bits.

The N multi-level signals are configured such that each multi-level signals has N signal levels, and at the same time each multi-level signal has a signal level different from that of the other (N−1) multi-level signals, whereby the signal levels of the N multi-level signals have P(N, N)=N! multi-level permutations.

The encoding table is defined such that each of $2^M$ binary permutations of the data signal is mapped into a respective pair of multi-level permutations of the N! multi-level permutations of the N multi-level signals, wherein each signal level in one of the respective pair of multi-level permutations, named as an odd multi-level permutation, is opposite to its corresponding signal level in the other of the respective pair of multi-level permutations, named as an even multi-level permutation.

Furthermore, the method includes the step of transmitting the stream of binary data segments in the form of the N multi-level signals simultaneously and respectively through the N multi-level data transmission channels such that when a binary data segment occurs in a (2K+1)-th time, the odd multi-level permutation of its respective pair of multi-level permutations is transmitted, when the binary data segment occurs in a (2K)-th time, the odd multi-level permutation of its respective pair of multi-level permutations is transmitted, thereby achieving a DC balance, wherein K is an integer greater than or equal to zero.

The transmitted N multi-level signals are decoded to obtain the data signal, where the decoding step comprise the step of comparing each two of the N multi-level signals transmitted through the two data transmission channels to obtain a respective bit of the M bits of each binary data segment of the data signal based on comparison between the two corresponding multi-level signals.

These and other aspects of the present invention will become apparent from the following description of the preferred embodiment taken in conjunction with the following drawings, although variations and modifications therein may be effected without departing from the spirit and scope of the novel concepts of the invention.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment, and wherein:

FIG. 1 shows schematically an encoding and decoding table for a 2B1T multi-level data transmission according to one embodiment of the present invention;

FIG. 6 shows schematically an encoding and decoding table for a 3B1Q multi-level data transmission according to one embodiment of the present invention;

DETAILED DESCRIPTION OF THE INVENTION

Figure 2:
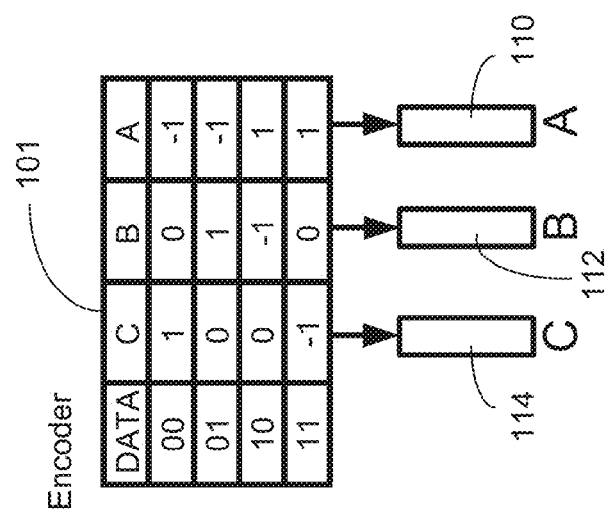
FIG. 2 shows schematically an encoder for a 2B1T multi-level data transmission according to one embodiment of the present invention.

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top", may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper", depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present invention, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

The description will be made as to the embodiments of the present invention in conjunction with the accompanying drawings in FIGS. 1-11. In accordance with the purposes of this invention, as embodied and broadly described herein, this invention, in one aspect, relates to methods and systems that utilize multiple multi-level signals to transmit a data signal.

In one embodiment, the method is corresponding to a 2B1T method for high speed multi-level data transmission, where a data signal with its length of two bits (2B) is transmitted in the form of three ternary signals (1T) simultaneously and respectively through three data transmission channels, thereby increasing the data transmission rate significantly. The 2B1T method is hereinafter described in detail with reference to FIGS. 1-5.

The 2B1T method includes encoding a data signal to be transmitted into first, second and third ternary signals in accordance with an encoding table. The data signal to be transmitted can be an analog signal or a digital signal in any format. The first, second and third ternary signals are configured such that each of the first, second and third ternary signals has three signal levels, and at the same time each of the first, second and third ternary signals has a signal level different from that of the other two of the first, second and third ternary signals. As such, the cumulative signal level of the first, second and third ternary signals is zero, and thus, there is no electromagnetic interference (EMI) during the data transmission.

According to one embodiment of the invention, the data signal needs to be converted into a stream of binary data segments. Each binary data segment has the data length of two bits comprising the first bit and the second bit. For example, each binary data segment is expressed as one of four binary permutations of the first and second bits, (00), (01), (10) and (11). For a binary data segment "01", the first bit of the binary data segment is "0" and the second bit of the binary data segment is "1". The stream of binary data segments is then mapped onto the first, second and third ternary signals in accordance with the encoding table, as shown in FIG. 1.

The encoding (or convention, or mapping) table is defined as follows. For the 2B1T data transmission scheme, three ternary level data are provided, where each of the three ternary level data has a different level from the other two of the three ternary level data. In one embodiment, the three ternary level data comprise a positive level data (shown as 1), a zero level data (shown as 0), and a negative level data (shown as −1), so that a cumulative signal level of the three ternary level data at the same time is always zero. Since all three ternary level data have different signal levels, permuting the three ternary level data generates six ternary permutations, as shown by (A, B, C) in the encoding table of FIG. 1, which include (−1, 0, 1), (−1, 1, 0), (1, −1, 0), (1, 0, −1), (0, 1, −1) and (0, −1, 1). Each permutation is corresponding to a respective state of the three ternary level data at a unit interval (UI) of time during the data transmission.

The permutations (A, B, C) of the three ternary level data are used for transmitting of the stream of binary data segments with the length of two bits, which are expressed in the four binary permutations, (00), (01), (10) and (11), as disclosed above. To map the four binary permutations into the six ternary permutations, four of the six ternary permutations are assigned as four data permutations for transmitting the signal, such that each of the four data permutations corresponds to a binary number between 00 (decimal number of 0) and 11 (decimal number of 3), and vice versus, which define the 2B1T encoding table. As shown in FIG. 1, in the 2B1T encoding table, decimal numbers (DEC) 0, 1, 2 and 3 are respectively expressed as binary numbers/permutations (BIN) (00), (01), (10) and (11), which in turn, correspond to four data permutations of the six ternary permutations (−1, 0, 1), (−1, 1, 0), (1, −1, 0) and (1, 0, −1), respectively. Specifically, of the four data permutations, the data permutation (−1, 0, 1) corresponds to the binary number 00 (the decimal number 0), the data permutation (−1, 1, 0) corresponds to the binary number 01 (the decimal number 1), the data permutation (1, −1, 0) corresponds to the binary number 10 (the decimal number 2), and the data permutation (1, 0, −1) corresponds to the binary number 11 (the decimal number 3). The correspondence between the data permutations and the binary numbers defines a 2B1T encoding table as shown in FIG. 1. In addition, the other two ternary permutations (0, 1, −1) and (0, −1, 1) of the three ternary signals A, B and C are assigned as command codes: Command#1 and Command#2, which can be used to provide control signals, such as clock signals. In one embodiment, the 2B1T encoding table is corresponding to a look-up table for data mapping.

Once the 2B1T encoding table is defined, the stream of binary data segments is mapped onto the first, second and third ternary signals A, B and C in accordance with the encoding table. In other words, each of the binary data segments is mapped or projected onto a corresponding data permutation. For example, the binary data segment "00" is encoded to obtain the corresponding data permutation (−1, 0, 1) having the third ternary signals A=−1, B=0 and C=1; the binary data segment "01" is encoded to obtain the corresponding data permutation (−1, 1, 0) having the third ternary signals A=−1, B=1 and C=0; the binary data segment "10" is encoded to obtain the corresponding data permutation (1, −1, 0) having the third ternary signals A=1, B=−1 and C=0; and the binary data segment "11" is encoded to obtain the corresponding data permutation (1, 0, −1) having the third ternary signals A=1, B=0 and C=−1. The other two ternary permutations (0, 1, −1), where A=0, B=1 and C=−1, and (0, −1, 1), where A=0, B=−1 and C=1, of the three ternary signals A, B and C are used as Command#1 and Command#2, respectively.

Figure 5:
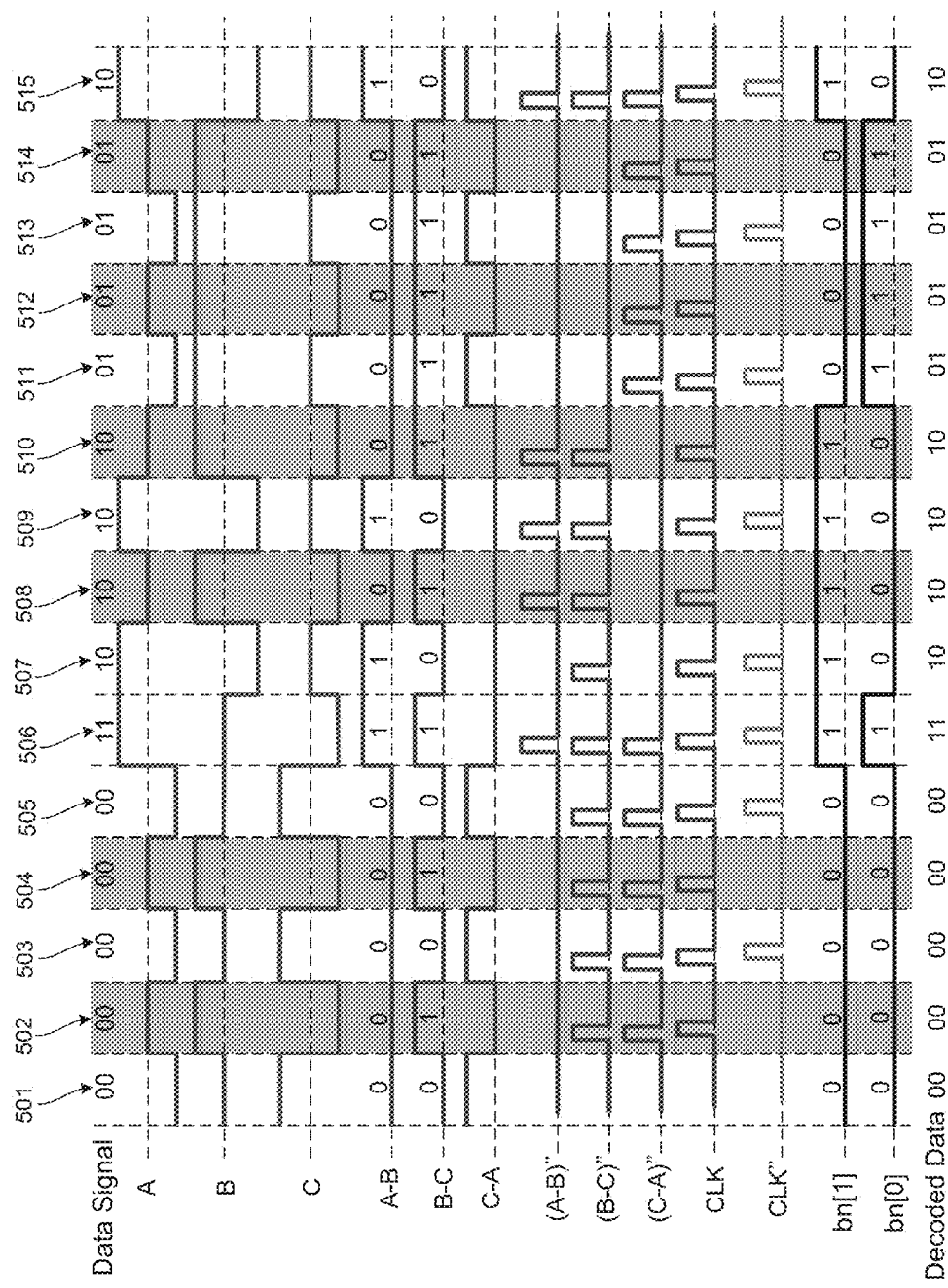
FIG. 5 shows schematically a signal diagram of a 2B1T multi-level data transmission according to another embodiment of the present invention.

FIG. 2 shows schematically an encoder for encoding binary data segments into first, second and third ternary signals in accordance with the encoding table 201. Three data transmission channels 210, 212 and 214 are connected to the encoder for simultaneously transmitting the first, second and third ternary signals A, B and C therethrough. Each of the corresponding data permutations (A, B, C) can be treated as a state of a first ternary signal A, a second ternary signal B and a third ternary signal C at the unit interval (UI) of time during the data transmission. For example, in the corresponding data permutation (−1, 0, 1), the first ternary signal A is −1, the second ternary signal B is 0, and the third ternary signal C is 1. In the corresponding data permutation (−1, 1, 0), the first ternary signal A is −1, the second ternary signal B is 1, and the third ternary signal C is 0. In the corresponding data permutation (1, −1, 0), the first ternary signal A is 1, the second ternary signal B is −1, and the third ternary signal C is 0. In the corresponding data permutation (1, 0, −1), the first ternary signal A is 1, the second ternary signal B is 0, and the third ternary signal C is −1. One example of the first, second and third ternary signals A, B and C and their relationship with two-bit binary data segments "00", "01", "10" and "11" are shown in FIG. 5. The various embodiments of the encoder are disclosed in U.S. patent application Ser. No. 13/466,607, which is incorporated herein in its entirety by reference.

According to the invention, the stream of binary data segments of the data signal is transmitted in the form of the first, second and third ternary signals A, B and C, simultaneously through the first, second and third data transmission channels 110, 112 and 114, respectively. The three data transmission channels 110, 112 and 114 can be conductive wires/lines, data bus, optical fibers, or wireless data transmission means. More specifically, during the data transmission, when two consecutive binary data segments of the data signal are identical, a second binary data segment of the two consecutive binary data segments is replaced with one of the first and second command codes. For example, in the embodiment shown in FIG. 5, the data signal is characterized with a stream of binary data segments 501-515. Of them, the two consecutive binary data segments, 501 and 502, 503 and 504, 507 and 508, 509 and 510, 511 and 512, 513 and 514, of the data signal are identical. Accordingly, for the binary data segment (00) 501, A=−1, B=0 and C=1, while for the repeated binary data segment (00) 502, A=0, B=1 and C=−1, which is corresponding to the first command code, Command#1. Similarly, for the binary data segment (10) 507, A=1, B=−1 and C=0, while for the repeated binary data segment (10) 508, A=0, B=1 and C=−1, which is corresponding to the first command code, Command#1. For the binary data segment (01) 511, A=−1, B=1 and C=0, while for the repeated binary data segment (01) 512, A=0, B=1 and C=−1, which is corresponding to the first command code, Command#1. The data transmission scheme is corresponding to run length=1T and ensures that there is a voltage transition per a unit interval of time in each data transmission channel during the data transmission. Since these voltage transitions occur at each unit interval of time, it can be directly extracted, as a clock signal, CLK, by a logic circuit. Accordingly to the invention, no clock data recovery (CDR) circuit is needed to obtain the clock signal CLK, which simplifies the design and reduces the cost.

Figure 3:
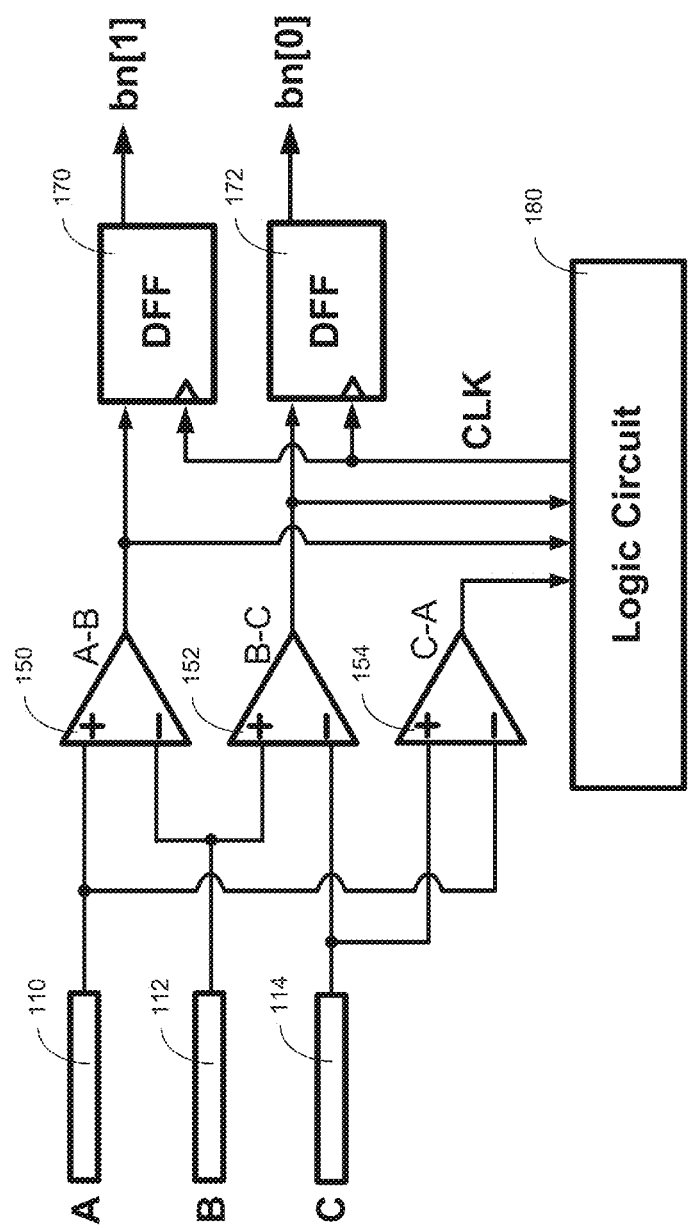
FIG. 3 shows schematically a decoder for a 2B1T multi-level data transmission according to one embodiment of the present invention.
Figure 4:
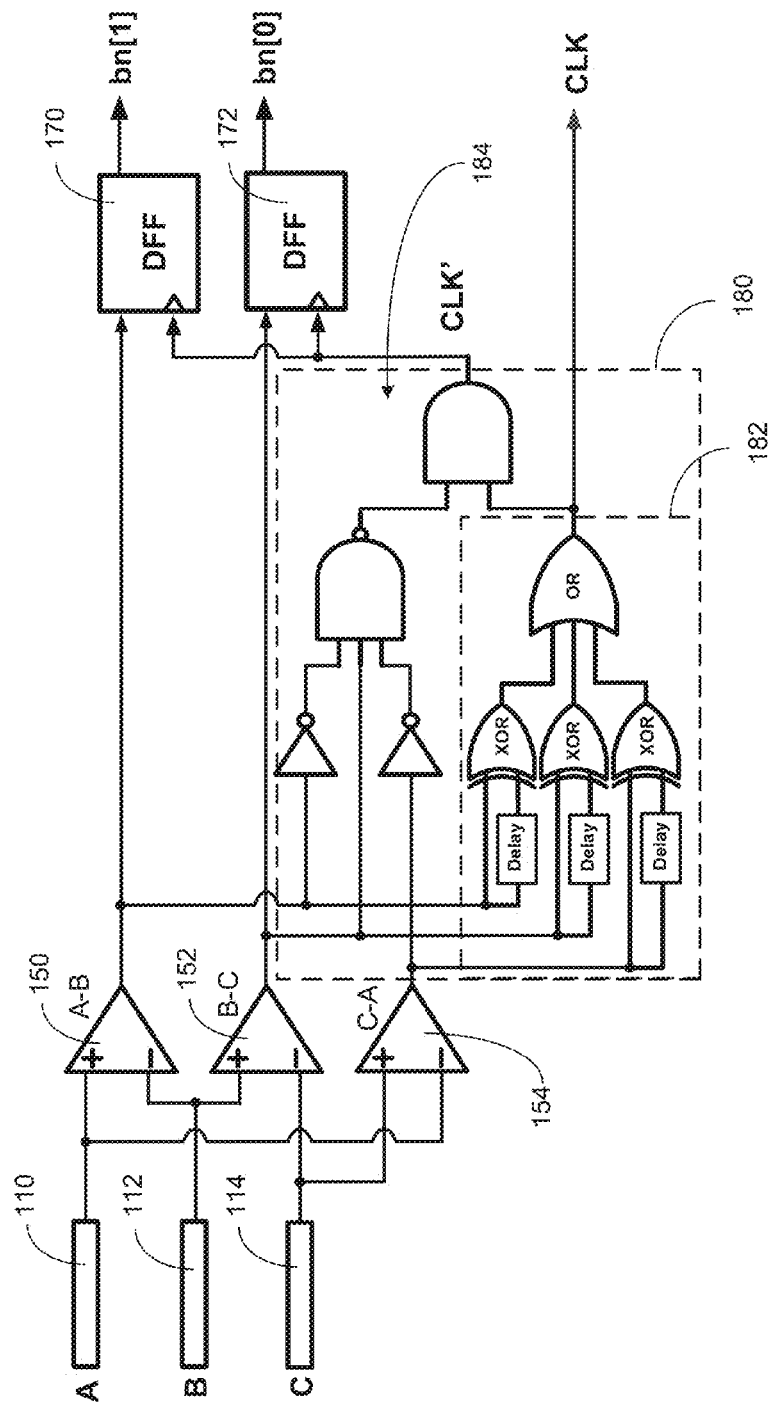
FIG. 4 shows schematically a decoder for a 2B1T multi-level data transmission according to another embodiment of the present invention.

FIGS. 3 and 4 show a decoder for decoding the transmitted first, second and third ternary signals A, B and C over the data transmission channels 110, 112 and 114 into the data signal according to two embodiments of the invention, where no complex devices or processes are needed to decode or restore the transmitted first, second and third ternary signals A, B and C into the data signal.

In one embodiment, the relationship between a specific binary data segment and its corresponding data permutation is shown in the decoding table of FIG. 1, where the first ternary signal A minus the second ternary signal B corresponds to the first bit of the binary data segment, and the second ternary signal B minus the third ternary signal C corresponds to the second bit of the binary data segment. The correspondence between the comparison of the two ternary signals and the bits of the binary data segment can be achieved by comparators. Specifically, if the comparison of the ternary signals generates a positive value, the corresponding bit is "1", and if the comparison of the ternary signals generates a negative value, the corresponding bit is "0". For example, in the corresponding data permutation (−1, 0, 1), the first ternary signal A minus the second ternary signal B is a negative value, which corresponds to the first bit "0" of the binary data segment "00", and the second ternary signal B minus the third ternary signal C is a negative value, which corresponds to the second bit "0" of the binary data segment "00". In the corresponding data permutation (−1, 1, 0), the first ternary signal A minus the second ternary signal B is a negative value, which corresponds to the first bit "0" of the binary data segment "01", and the second ternary signal B minus the third ternary signal C is a positive value, which corresponds to the second bit "1" of the binary data segment "01". In the corresponding data permutation (1, −1, 0), the first ternary signal A minus the second ternary signal B is a positive value, which corresponds to the first bit "1" of the binary data segment "10", and the second ternary signal B minus the third ternary signal C is a negative value, which corresponds to the second bit "0" of the binary data segment "10". In the corresponding data permutation (1, 0, −1), the first ternary signal A minus the second ternary signal B is a positive value, which corresponds to the first bit "1" of the binary data segment "11", and the second ternary signal B minus the third ternary signal C is a positive value, which corresponds to the second bit "1" of the binary data segment "11".

As discussed above, the decoding/restoring process of the transmitted first, second and third ternary signals A, B and C into the data signal can be achieved by three comparators 150, 152 and 154. The first comparator 150 is electrically coupled to the first and second data transmission channels 110 and 112. The second comparator 152 is electrically coupled to the second and third data transmission channels 112 and 114. The third comparator 154 is electrically coupled to the first and third data transmission channels 110 and 114. The first comparator 150 compares the first ternary signal A to the second ternary signal B to obtain the first bit bn[1] of the binary data segment, and the second comparator 152 compares the second ternary signal B to the third ternary signal C to obtain the second bit bn[0] of the binary data segment. More specifically, if the first ternary signal A minus the second ternary signal B is a positive value, the first bit bn[1] is "1", and the first ternary signal A minus the second ternary signal B is a negative value, the first bit bn[1] is "0". Similarly, the second comparator 152 receives the second ternary signal B and the third ternary signal C and generates the second bit bn[0] of the binary data signal based on comparison between the second ternary signal B and the third ternary signal C. If the second ternary signal B minus the third ternary signal C is a positive value, the second bit bn[0] is "1", and the second ternary signal B minus the third ternary signal C is a negative value, the second bit bn[0] is "0". Further, the third comparator 154 receives the third ternary signal C to the first ternary signal A and generates a check bit based on comparison between the third ternary signal C and the first ternary signal A to distinguish the data permutation and the command code. The relationships between any two, i.e., (A-B), (B-C) and (C-A), of the first, second and third ternary signals A, B and C are shown in FIG. 5.

Accordingly to the invention, the run length is set to be 1T, that is, each two consecutive data segments have a state transition, which is effectively corresponding to an embedded clock. Thus, a simple logic circuit, without a need of a complicate CDR circuit, can be used to extract the clock signal, which reduces the circuit area and power consumption. Further, there is no need of an external clock in the multi-level data transmission, and thus there is no skewing problems the multi-level data transmission.

As shown in FIGS. 3 and 4, the logic circuit 180 electrically coupled to the outputs of the first comparator 150, the second comparator 152, and the third comparator 154 is utilized to generate a clock signal CLK, and a signal CLK" for latch data.

For example, in one embodiment shown in FIG. 4, the logic circuit 180 include a first logic circuit 182 electrically connected to the outputs of the first, second and third comparators 150, 152 and 154. The output signals are subjected to XOR and Delay operations so as to obtain the respective transition pulse, represented by (A-B)", (B-C)' or (C-A)', of each output signal, which is in turn subjected to an OR operation to obtain the clock signal CLK, as shown in FIG. 5.

Further, the logic circuit 180 may also include a second logic circuit 184 electrically connected to the outputs of the first, second and third comparators 150, 152 and 154, and the output (i.e., the clock signal CLK) of the first logic circuit 182 for detecting the repeat data segments and combining the detection with the clock signal CLK to obtain the latch data signal CLK", as shown in FIG. 5.

It should be noted that the above-disclosed 2B1T data transmission method can also be utilized for an M-bit and N-level data transmission, where M, N are integers, N>2, M≥2, and N!>$2^M$.

In the M-bit and N-level data transmission, the data signal is characterized with a stream of binary data segments each of which has a data length of M bits comprising a first, second, . . . , and M-th bits, where each stream of binary data segment is corresponding to one of $2^M$ binary permutations of the first, second, . . . , and M-th bits. Then, the data signal in the form of the stream of binary data segments is encoded into N multi-level signals in accordance with an encoding table.

The N multi-level signals are configured such that each multi-level signals has N signal levels, and at the same time each multi-level signal has a signal level different from that of the other (N−1) multi-level signals, whereby the signal levels of the N multi-level signals have P(N, N)=N! multi-level permutations.

In one embodiment, the encoding table is defined such that $2^M$ multi-level permutations of the N! multi-level permutations of the N multi-level signals are assigned corresponding to the $2^M$ binary permutations of the data signal, respectively, and the other multi-level permutations are assigned corresponding to command codes, respectively.

Then, the stream of binary data segments is transmitted in the form of the N multi-level signals simultaneously and respectively through first, second, . . . , N-th data transmission channels, such that when two consecutive binary data segments are identical, a second binary data segment of the two consecutive binary data segments is replaced with one of the command codes.

Similarly, by comparing each two of the N multi-level signals transmitted through the two data transmission channels, the transmitted N multi-level signals can be decoded into the data signal.

Referring now to FIG. 6-11, a 3B1Q method for high speed multi-level data transmission is shown according to one embodiment of the present invention, where a data signal with its length of three bits (3B) is transmitted in the form of four quaternary signals (1Q) simultaneously and respectively through four data transmission channels.

The 3B1Q method includes encoding a 3-bit data signal to be transmitted into first, second, third and fourth quaternary signals A, B, C and D in accordance with an encoding table, as shown in FIG. 6.

According to one embodiment of the invention, the data signal is first converted into a stream of binary data segments with a data length of three bits. For example, each binary data segment is expressed as one of eight (8) binary permutations of the first bit, the second bit, and the third bit, (000), (001), (010), . . . and (111). For a binary data segment "010", for example, the first bit of the binary data segment is "0", the second bit of the binary data segment is "1", and the third bit of the binary data segment is "0". In one embodiment, each binary data segment is assigned with an odd polarity and an even polarity, which are respectively used to identify the odd times and the even times which the binary data segment occurs during the data transmission. The stream of binary data segments is then mapped onto the first, second, third and fourth quaternary signals A, B, C and D in accordance with the encoding table.

The first, second, third and fourth quaternary signals A, B, C and D are configured such that each of the first, second, third and fourth quaternary signals A, B, C and D has four signal levels, and at the same time each of the first, second, third and fourth quaternary signals A, B, C and D has a signal level different from that of the other three of the first, second, third and fourth quaternary signals A, B, C and D. As shown in FIG. 6, the four quaternary level data comprise a +3 level data, a +1 level data, a −1 level data, and a −3 level data, with the signal level between each of the quaternary level data being the same level of 2. Other values can also be assigned as data levels for practice of the invention. As such, the cumulative signal level of the first, second, third and fourth quaternary signals A, B, C and D is zero, and thus, there is no EMI occurred during the data transmission.

Since all four quaternary level data have different signal levels, permuting of the four quaternary level data generates twenty-four (24) quaternary permutations, as shown by (A, B, C, D) in the encoding table of FIG. 6. The permutations (A, B, C, D) of the four quaternary level data are used for transmitting of the binary signal with the length of three bits. Each permutation is corresponding to a respective state of the four quaternary level data at a UI of time during the data transmission.

Of the twenty-four (24) quaternary permutations, sixteen (16) data permutations are used for encoding the 3-bit signal with the odd and even polarities, while the other eight remaining quaternary permutations are used as control codes. Each pair of the sixteen data permutations corresponds to a binary number between 000 (decimal number of 0) and 111 (decimal number of 7). Of the sixteen permutations, eight permutations are corresponding to the 3-bit signal with the odd polarity, while the other eight permutations are corresponding to the 3-bit signal with the even polarity.

In other words, for each binary segment/number, there is a respective pair of quaternary permutations. Each signal level in one of the respective pair of quaternary permutations, named as an odd quaternary permutation, is opposite to its corresponding signal level in the other of the respective pair of quaternary permutations, named as an even quaternary permutation. For example, the binary number "000" corresponds to the even quaternary permutation (3, −1, 1, −3) and the odd quaternary permutation (−3, −1, 1, 3); the binary number "001" corresponds to the even quaternary permutation (1, −3, −1, 3) and the odd quaternary permutation (−1, 3, 1, −3); and so on, as shown in FIG. 6. The correspondence between the quaternary permutations and the binary segments defines the 3B1Q encoding table shown in FIG. 6.

Once the 3B1Q encoding table is defined, the stream of binary data segments is mapped onto the first, second, third and fourth quaternary signals A, B, C and D in accordance with the encoding table. According the 3B1Q encoding table, for example, a binary data segment "010" with an even polarity is encoded the quaternary permutation (1, −1, 3, −3) having the first, second, third and fourth quaternary signals A=1, B=−1, C=3 and D=−3, while a binary data segment "010" with an odd polarity is encoded the permutation (−1, 1, −3, 3) having the first, second, third and fourth quaternary signals A=−1, B=1, C=−3 and D=−3.

Figure 7:
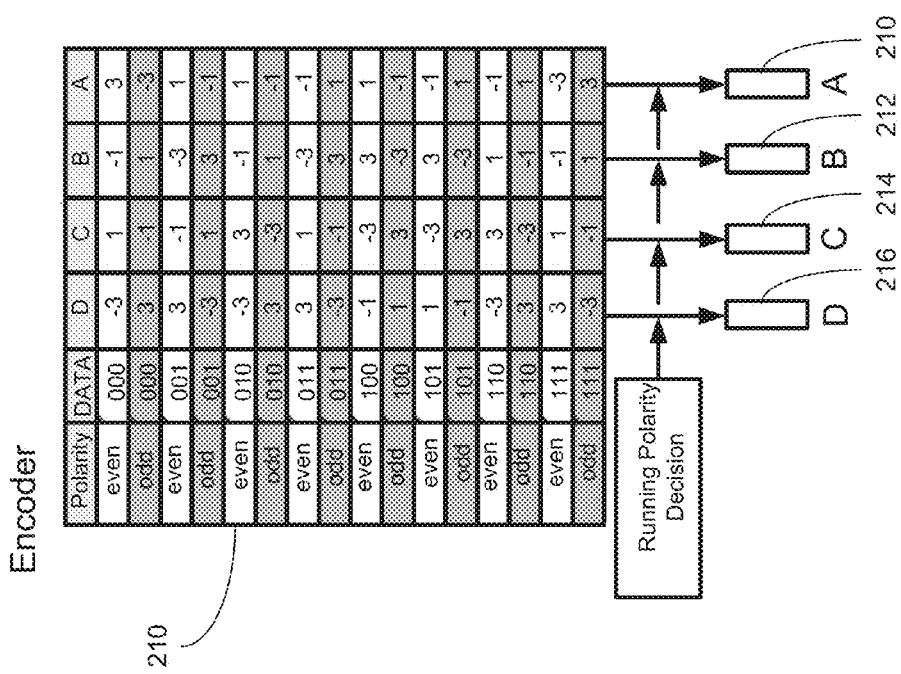
FIG. 7 shows schematically an encoder for a 3B1Q multi-level data transmission according to one embodiment of the present invention.

FIG. 7 shows schematically an encoder of a 3B1Q system for high speed multi-level data transmission based on the encoding table 201 according to one embodiment of the present invention. Similarly, each of the corresponding data permutations (A, B, C, D) can be treated as a corresponding state of a first quaternary signal A, a second quaternary signal B, a third quaternary signal C and a fourth quaternary signal D. For example, in the corresponding data permutation (1, 3, −1, −3), the first quaternary signal A is 1, the second quaternary signal B is 3, the third quaternary signal C is −1, and the fourth quaternary signal D is −3.

The encoded first, second, third and fourth quaternary signals A, B, C and D are simultaneously transmitted through four data transmission channels 210, 212, 214 and 216, respectively. Similarly, the four data transmission channels 210, 212, 214 and 216 can be conductive wires/lines, data bus, optical fibers, or wireless data transmission means.

According to the 3B1Q data transmission scheme, the 3-bit data signal (a stream of binary data segments) is transmitted in the form of the first, second, third and fourth quaternary signals A, B, C and D simultaneously and respectively through first, second, third and fourth data transmission channels 210, 212, 214 and 216 as follows: when a binary data segment occurs in a (2K+1)-th time, the respective odd quaternary permutation is transmitted, and when the binary data segment occurs in a (2K)-th time, the respective even quaternary permutation is transmitted, thereby achieving a DC balance, where K is an integer greater than or equal to zero. For example, in one embodiment shown in FIG. 9, the Data Signal is characterized with a stream of binary data segments 601-615. For the binary data segment "000", when it is present at the first (odd) time, i.e., the binary data segment 601, it is transmitted according to its odd quaternary permutation, (A, B, C, D)=(−3, −1, 1, 3); when it is present at the second (even) time, i.e., the binary data segment 602, it is transmitted according to its even quaternary permutation, (A, B, C, D)= (3, 1, −1, −3); when is present at the third (odd) time, i.e., the binary data segment 603, it is transmitted according to its odd quaternary permutation, (A, B, C, D)=(−3, −1, 1, 3); and when it is present at the fourth (even) time, i.e., the binary data segment 614, it is transmitted according to its even quaternary permutation, (A, B, C, D)=(3, 1, −1, −3). Similarly, for the binary data segment "101", when it is present at the first (odd) time, i.e., the binary data segment 604, it is transmitted according to its odd quaternary permutation, (A, B, C, D)=(1, −3, 3, −1); when it is present at the second (even) time, i.e., the binary data segment 611, it is transmitted according to its even quaternary permutation, (A, B, C, D)=(−1, 3, −3, 1).

Figure 8:
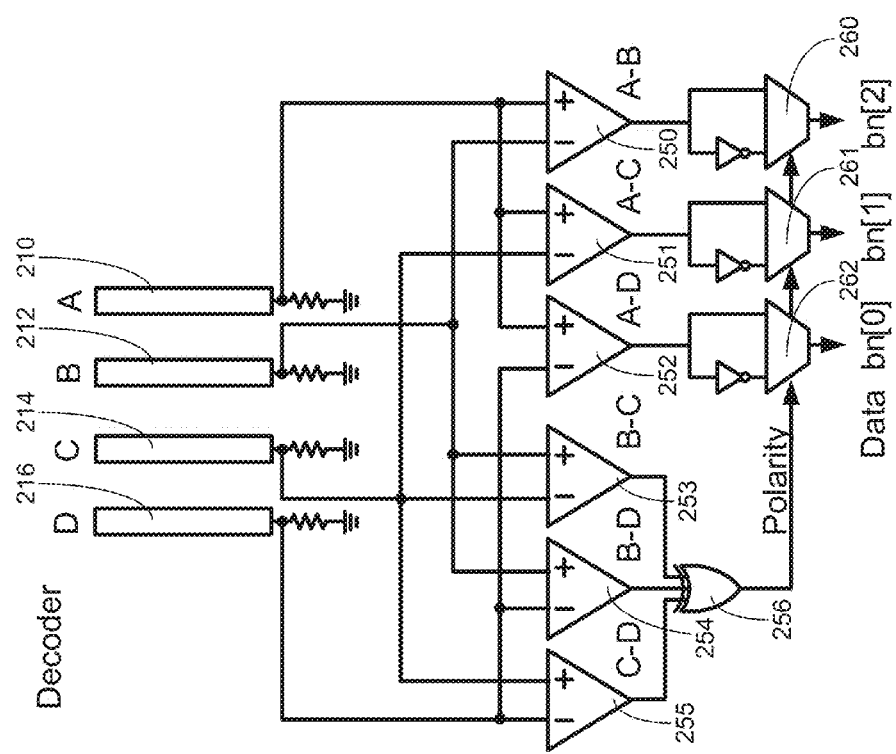
FIG. 8 shows schematically a decoder for a 3B1Q multi-level data transmission according to one embodiment of the present invention.
Figure 9:
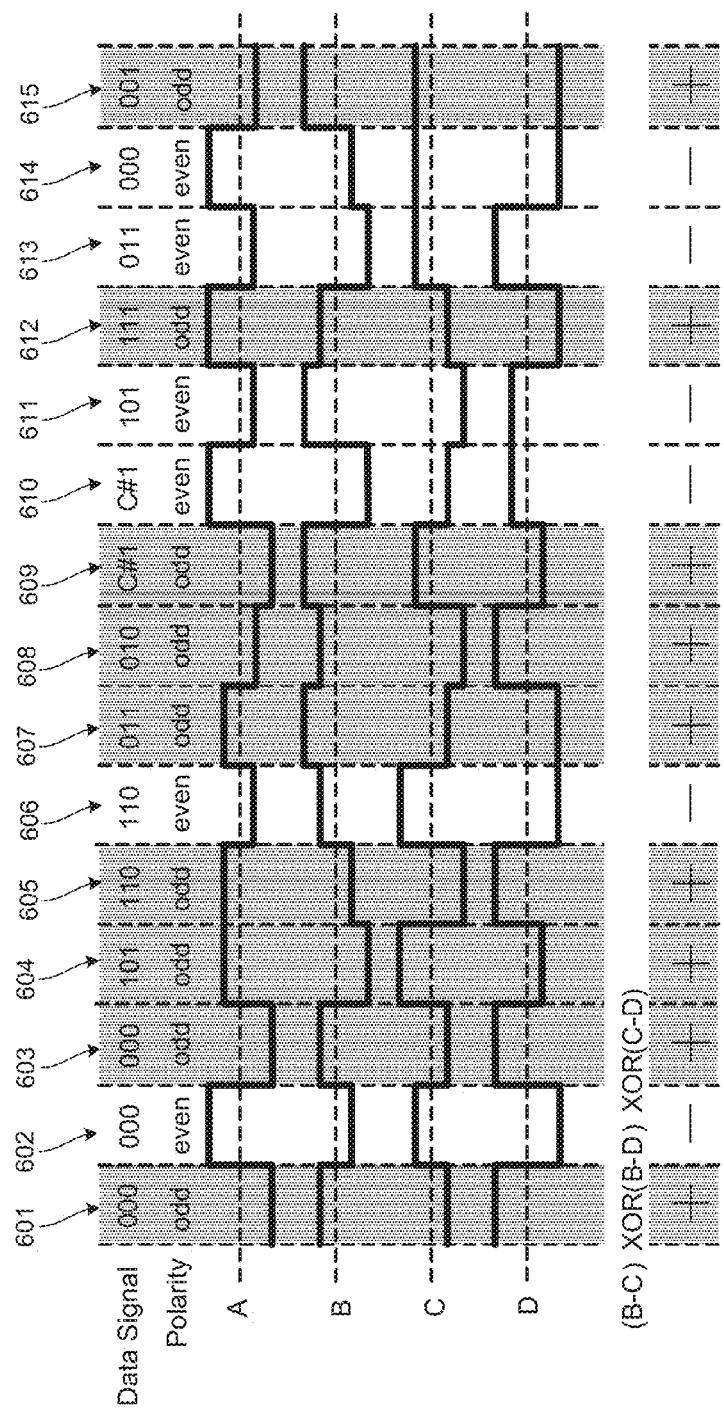
FIG. 9 shows schematically a signal diagram of a 3B1Q multi-level data transmission according to another embodiment of the present invention.

The transmitted first, second, third and fourth quaternary signals A, B, C and D over the four data transmission channels 210, 212, 214 and 216 are decoded into the data signal, for example, by a decoder, as shown in FIG. 8. According to the invention, the decoding/restoring process of the transmitted first, second, third and fourth quaternary signals A, B, C and D into the data signal can be achieved by comparisons of these transmitted quaternary signals A, B, C and D.

In one embodiment, the relationship between a specific binary data segment and its corresponding data permutation is shown in FIG. 6, where the first quaternary signal A minus the second quaternary signal B corresponds to the first bit of the binary data segment, the first quaternary signal A minus the third quaternary signal C corresponds to the second bit of the binary data segment, the first quaternary signal A minus the fourth quaternary signal D corresponds to the third bit of the binary data segment, the second quaternary signal B minus the third quaternary signal C corresponds to a first intermediate bit, the second quaternary signal B minus the fourth quaternary signal D corresponds to a second intermediate bit, the third quaternary signal C minus the fourth quaternary signal D corresponds to a third intermediate bit, and an XOR result to first, second and third intermediate bits to obtain the polarity bit. As shown in FIG. 6, the XOR result is "0" when the polarity is "even" and "1" when the polarity is "odd". The correspondence between the comparison of the quaternary signals and the bits of the binary data segment can be achieved by comparators. Specifically, if the comparison of the quaternary signals generates a positive value, the corresponding bit is "1", and if the comparison of the quaternary signals generates a negative value, the corresponding bit is "0". For example, in the corresponding data permutation (1, 3, −1, −3), the first quaternary signal A minus the second quaternary signal B is a negative value, which corresponds to the first bit "0" of the binary data segment "011", the first quaternary signal A minus the third quaternary signal C is a positive value, which corresponds to the second bit "1" of the binary data segment "011", the first quaternary signal A minus the fourth quaternary signal D is a positive value, which corresponds to the third bit "1" of the binary data segment "011", the second quaternary signal B minus the third quaternary signal C is a positive value, which corresponds to a first intermediate bit "1", the second quaternary signal B minus the fourth quaternary signal D is a positive value, which corresponds to a second intermediate bit "1", the third quaternary signal C minus the fourth quaternary signal D is also a positive value, which corresponds to a third intermediate bit "1", and an XOR result to first, second and third intermediate bits is "1", which corresponds to the polarity "odd". In other words, the data permutation (1, 3, −1, −3) is an odd data permutation corresponding to the binary data segment "011".

As shown in FIG. 8, the decoder/receiver includes a first comparator 250, a second comparator 251, a third comparator 252, a fourth comparator 253, a fifth comparator 254, a sixth comparator 255, an XOR gate 256 and three selectors 260-262. The first comparator 250 is electrically coupled to the first and second data transmission channels 210 and 212. The second comparator 251 is electrically coupled to the first and third data transmission channels 210 and 214. The third comparator 252 is electrically coupled to the first and fourth data transmission channels 210 and 216. The fourth comparator 253 is electrically coupled to the second and third data transmission channels 212 and 214. The fifth comparator 254 is electrically coupled to the second and fourth data transmission channels 212 and 216. The sixth comparator 255 is electrically coupled to the third and fourth data transmission channels 214 and 216. The XOR gate 256 is electrically coupled to the fourth, fifth and sixth comparators 253, 254 and 255. Three selectors 270-272 receives the polarity bit from the XOR gate 256 and the corresponding output signal from its corresponding comparators 250, 251 and 252, and selectively outputs the corresponding first bit bn[2], second bit bn[1], and third bit bn[0] with the polarity bit of "even" or "odd" in accordance with the polarity bit.

The decoding process can be achieved by the comparators 250, 251, 252, 253, 254 and 255 and the XOR gate 256 shown in FIG. 8. In the exemplary embodiment, the first comparator 250 compares the first quaternary signal A to the second quaternary signal B to obtain the first bit bn[2] of the binary data segment. The second comparator 251 compares the first quaternary signal A to the third quaternary signal C to obtain the second bit bn[1] of the binary data segment. The third comparator 252 compares the first quaternary signal A to the fourth quaternary signal D to obtain the third bit bn[0] of the binary data segment. The fourth comparator 253 compares the second quaternary signal B to the third quaternary signal C to obtain the first intermediate bit. The fifth comparator 254 compares the second quaternary signal B to the fourth quaternary signal D to obtain the second intermediate bit. The sixth comparator 255 compares the third quaternary signal C to the fourth quaternary signal D to obtain the third intermediate bit. The XOR gate 256 performs the XOR operation to the first, second and third intermediate bits to obtain the polarity bit bn[0] of the binary data segment.

More specifically, if the first quaternary signal A minus the second quaternary signal B is a positive value, the first bit bn[2] is "1", and the first quaternary signal A minus the second quaternary signal B is a negative value, the first bit bn[2] is "0". Similarly, the second comparator 251 receives the first quaternary signal A and the third quaternary signal C and generates the second bit bn[1] of the binary data signal based on comparison between the first quaternary signal A and the third quaternary signal C. The third comparator 252 receives the first quaternary signal A and the fourth quaternary signal D and generates the third bit bn[0] of the binary data signal based on comparison between the first quaternary signal A and the fourth quaternary signal D. The fourth comparator 253 receives the second quaternary signal B and the third quaternary signal C and generates the first intermediate bit based on comparison between the second quaternary signal B and the third quaternary signal C. The fifth comparator 254 receives the second quaternary signal B and the fourth quaternary signal D and generates the second intermediate bit based on comparison between the second quaternary signal B and the fourth quaternary signal D. The sixth comparator 255 receives the third quaternary signal C and the fourth quaternary signal D and generates the third intermediate bit based on comparison between the third quaternary signal C and the fourth quaternary signal D. Further, the XOR gate 256 receives the first, second and third intermediate bits and generates the polarity bit, which is used as a clock signal CLK, based on a result of the XOR operation to the first, second and third intermediate bits. Since the clock signal CLK can be extracted by a simple logic circuit, no CDR circuit is required. Thus, for the multi-level data transmission, the circuit area and power consumption can be reduced.

Figure 10:
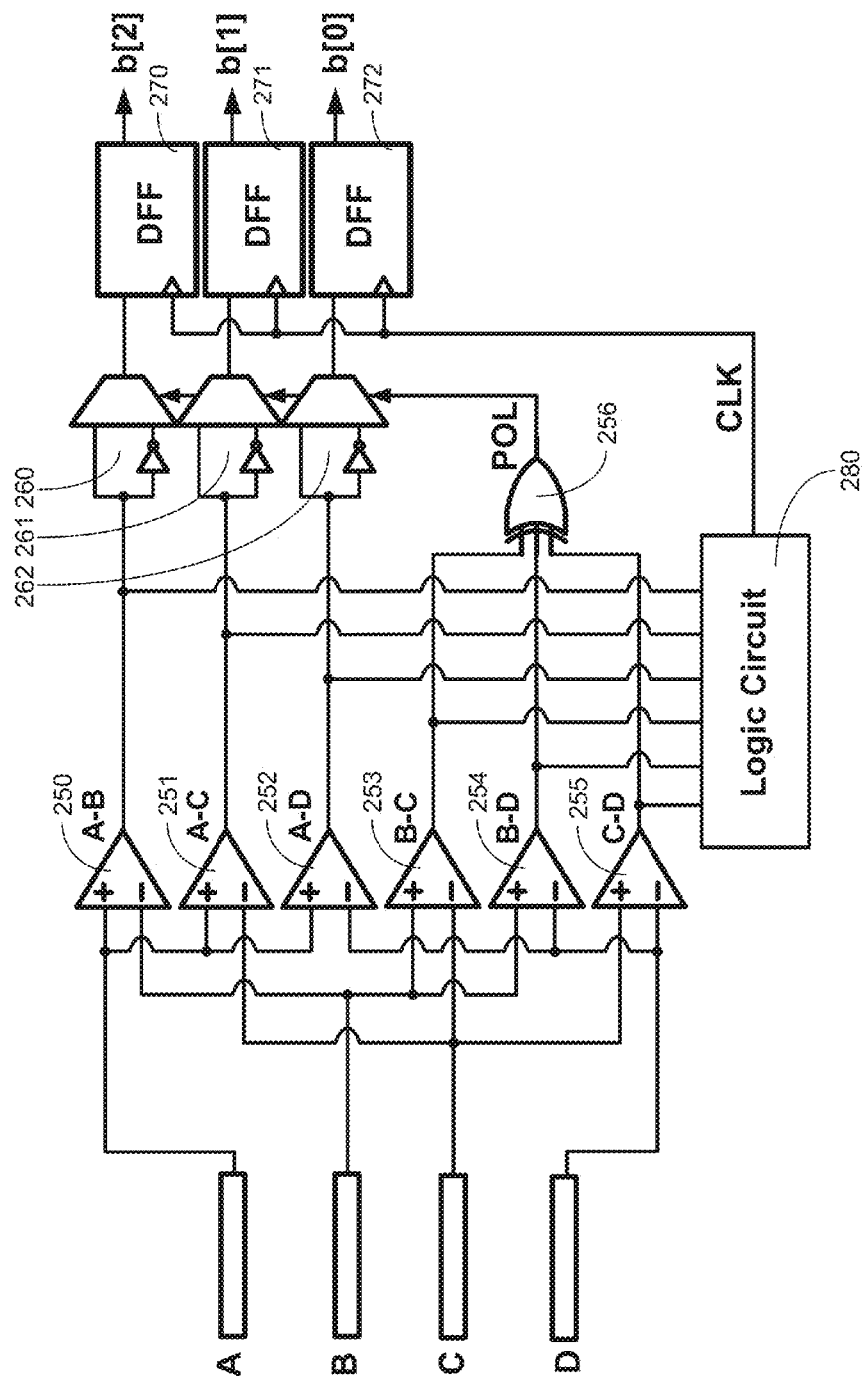
FIG. 10 shows schematically a decoder for a 3B1Q multi-level data transmission according to one embodiment of the present invention.
Figure 11:
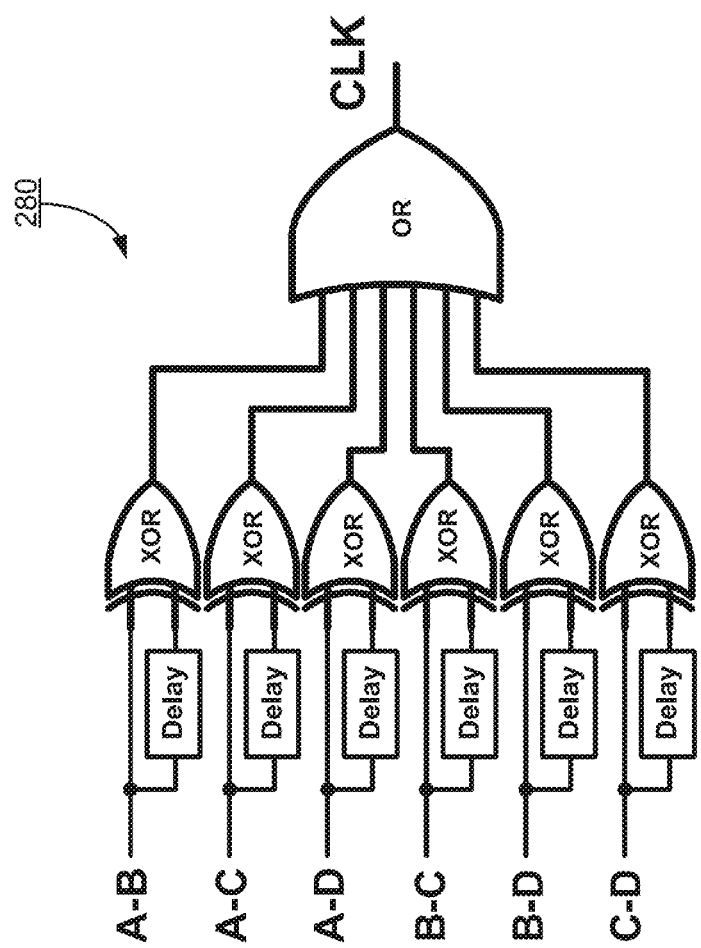
FIG. 11 shows schematically a logic circuit used in the decoder for a 3B1Q multi-level data transmission according to another embodiment of the present invention.

As shown in FIGS. 10 and 11, the logic circuit 280 electrically coupled to the outputs of the comparators 250-255 is utilized to generate a clock signal CLK. For example, in one embodiment shown in FIG. 11, the logic circuit 280 include six XOR and Delay gates electrically connected to the outputs of the comparators 250-255, respectively. The output signals are subjected to XOR and Delay operations so as to obtain the respective transition pulse of each output signal, which is in turn subjected to an OR operation to obtain the clock signal CLK, as shown in FIG. 11.

It should be noted that the above-disclosed 3B1Q data transmission method can also be utilized for an M-bit and N-level data transmission, where M, N are integers, N>2, M≥2, and N!≥2*($2^M$).

In the M-bit and N-level data transmission, the data signal is characterized with a stream of binary data segments each of which has a data length of M bits comprising a first, second, ..., and M-th bits, where each stream of binary data segment is corresponding to one of $2^M$ binary permutations of the first, second, ..., and M-th bits. Then, the data signal in the form of the stream of binary data segments is encoded into N multi-level signals in accordance with an encoding table.

The N multi-level signals are configured such that each multi-level signals has N signal levels, and at the same time each multi-level signal has a signal level different from that of the other (N-1) multi-level signals, whereby the signal levels of the N multi-level signals have P(N, N)=N! multi-level permutations.

The encoding table is defined such that each of $2^M$ binary permutations of the data signal is mapped into a respective pair of multi-level permutations of the N! multi-level permutations of the N multi-level signals, wherein each signal level in one of the respective pair of multi-level permutations, named as an odd multi-level permutation, is opposite to its corresponding signal level in the other of the respective pair of multi-level permutations, named as an even multi-level permutation.

Then, the stream of binary data segments is transmitted in the form of the N multi-level signals simultaneously and respectively through first, second, ..., N-th data transmission channels, such that when a binary data segment occurs in a (2K+1)-th time, the odd multi-level permutation of its respective pair of multi-level permutations is transmitted, when the binary data segment occurs in a (2K)-th time, the odd multi-level permutation of its respective pair of multi-level permutations is transmitted, thereby achieving a DC balance, wherein K is an integer greater than or equal to zero.

The transmitted N multi-level signals can be decoded to obtain the data signal, by comparing each two of the N multi-level signals transmitted through the two data transmission channels.

In brief, the present invention recites methods and systems of high speed data transmission that, among other things, encode a binary data signal into multiple multi-level signals transmitted over multiple data transmission channels, thus, the data transmission rate can be increased significantly. Further, because all multi-level signals have different signal levels with the other multi-level signals, there is no need to provide additional reference voltage as the reference signal for decoding the multi-level signals at the receiver, which greatly reduces the complexity of the circuitry design.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A method for data transmission, comprising the steps of:
   (a) encoding a data signal to be transmitted into first, second and third ternary signals in accordance with an encoding table,
      wherein the data signal is characterized with a stream of binary data segments each of which has a data length of two bits comprising a first bit and a second bit, thereby corresponding to one of four binary permutations of the first and second bits;

wherein the first, second and third ternary signals are configured such that each of the first, second and third ternary signals has three signal levels, and at the same time each of the first, second and third ternary signals has a signal level different from that of the other two of the first, second and third ternary signals, whereby the signal levels of the first, second and third ternary signals have six ternary permutations; and wherein the encoding table is defined such that four of the six ternary permutations of the first, second and third ternary signals are assigned corresponding to the four binary permutations of the data signal, respectively, and the other two of the six ternary permutations of the first, second and third ternary signals are assigned corresponding to first and second command codes, respectively;

(c) transmitting the stream of binary data segments in the form of the first, second and third ternary signals simultaneously and respectively through first, second and third data transmission channels such that when two consecutive binary data segments are identical, a second binary data segment of the two consecutive binary data segments is replaced with one of the first and second command codes; and (d) decoding the transmitted first, second and third ternary signals to obtain the data signal.

2. The method of claim 1, wherein the three signal levels of each of the first, second and third ternary signals comprise a positive level, a zero level, and a negative level, and wherein a cumulative signal level of the first, second and third ternary signals is zero.

3. The method of claim 1, wherein the encoding step comprises the steps of:

converting the data signal into the stream of binary data segments each of which has the data length of two bits comprising the first bit and the second bit; and mapping the stream of binary data segments onto the first, second and third ternary signals in accordance with the encoding table.

4. The method of claim 1, wherein the decoding step comprises the step of comparing each two of the transmitted first and second ternary signals, performed with three comparators coupled to the first, second and third data transmission channels.

5. The method of claim 4, wherein the comparing step comprises the steps of:

comparing the transmitted first and second ternary signals to obtain the second bit of each binary data segment of the data signal; and comparing the transmitted second and third ternary signal to obtain the first bit of each binary data segment of the data signal.

6. The method of claim 4, wherein the decoding step further comprises the step of obtaining a clock signal, performed with a logic circuit.

7. The method of claim 6, wherein the decoding step further comprises the steps of obtaining a signal for latch data.

8. A method for data transmission, comprising the steps of:

(a) encoding a data signal to be transmitted into N multi-level signals in accordance with an encoding table, wherein the data signal is characterized with a stream of binary data segments each of which has a data length of M bits comprising a first, second, . . . , and M-th bits, M, N being integers, N>2, M≥2, and N!>$2^M$, wherein each stream of binary data segment is corresponding to one of $2^M$ binary permutations of the first, second, . . . , and M-th bits;

wherein the N multi-level signals are configured such that each multi-level signals has N signal levels, and at the same time each multi-level signal has a signal level different from that of the other (N−1) multi-level signals, whereby the signal levels of the N multi-level signals have P(N, N)=N! multi-level permutations; and wherein the encoding table is defined such that $2^M$ multi-level permutations of the N! multi-level permutations of the N multi-level signals are assigned corresponding to the $2^M$ binary permutations of the data signal, respectively, and the other multi-level permutations are assigned corresponding to command codes, respectively;

(b) transmitting the stream of binary data segments in the form of the N multi-level signals simultaneously and respectively through first, second, . . . , N-th data transmission channels such that when two consecutive binary data segments are identical, a second binary data segment of the two consecutive binary data segments is replaced with one of the command codes; and (b) decoding the N multi-level signals to obtain the data signal.

9. The method of claim 8, wherein a cumulative signal level of the N multi-level signals is zero.

10. The method of claim 8, wherein the decoding step comprise the step of comparing each two of the N multi-level signals transmitted through the two data transmission channels to obtain a respective bit of the M bits of each binary data segment of the data signal based on comparison between the two corresponding multi-level signals.

11. A method for data transmission, comprising the steps of:

(a) encoding a data signal to be transmitted into first, second, third and fourth quaternary signals in accordance with an encoding table, wherein the data signal is characterized with a stream of binary data segments each of which has a data length of three bits comprising a first bit, a second bit and a third bit, thereby corresponding to one of eight binary permutations of the first, second and third bits;

wherein the first, second, third and fourth quaternary signals are configured such that each of the first, second, third and fourth quaternary signals has four signal levels, and at the same time each of the first, second, third and fourth quaternary signals has a signal level different from that of the other three of the first, second, third and fourth quaternary signals, whereby the signal levels of the first, second, third and fourth quaternary signals have twenty-four quaternary permutations; and wherein the encoding table is defined such that each of eight binary permutations of the data signal is mapped into a respective pair of quaternary permutations of the twenty-four quaternary permutations of the first, second, third and fourth quaternary signals, wherein each signal level in one of the respective pair of quaternary permutations, named as an odd quaternary permutation, is opposite to its corresponding signal level in the other of the respective pair of quaternary permutations, named as an even quaternary permutation;

(b) transmitting the stream of binary data segments in the form of the first, second, third and fourth quaternary signals simultaneously and respectively through first, second, third and fourth data transmission channels such that when a binary data segment occurs in a (2K+1)-th time, the odd quaternary permutation of its respective pair of quaternary permutations is transmitted, when the binary data segment occurs in a (2K)-th time, the even quaternary permutation of its respective pair of quaternary permutations is transmitted, thereby achieving a DC balance, wherein K is an integer greater than or equal to zero; and (c) decoding the transmitted first, second, third and fourth quaternary signals to obtain the data signal.

12. The method of claim 11, wherein a cumulative signal level of the first, second, third and fourth quaternary signals is zero.

13. The method of claim 11, wherein the encoding step comprises the steps of:

converting the data signal into the stream of binary data segments each of which has the data length of three bits comprising the first, second and third bits; and mapping the stream of binary data segments onto the first, second, third and fourth quaternary signals in accordance with the encoding table.

14. The method of claim 11, wherein the other eight of the twenty-four quaternary permutations of the signal levels of the first, second, third and fourth quaternary signals are adapted as command codes.

15. The method of claim 11, wherein the decoding step further comprises the steps of:

comparing the transmitted first and second quaternary signals to obtain the first bit of each binary data segment of the data signal;

comparing the transmitted first and third quaternary signals to obtain the second bit of each binary data segment of the data signal; and comparing the transmitted first and fourth quaternary signals to obtain the third bit of each binary data segment of the data signal.

16. The method of claim 15, wherein the decoding step further comprises the step of obtaining a clock signal, performed with a logic circuit.

17. The method of claim 16, wherein the step of obtaining the clock signal comprises the steps of:

comparing the transmitted second and third quaternary signals to obtain a first intermediate bit;

comparing the transmitted second and fourth quaternary signals to obtain a second intermediate bit;

comparing the transmitted third and fourth quaternary signals to obtain a third intermediate bit; and performing an exclusive-or (XOR) operation to the first, second and third intermediate bits to obtain the clock signal.

18. A method for data transmission, comprising the steps of:

(a) encoding a data signal to be transmitted into N multi-level signals in accordance with an encoding table, wherein the data signal is characterized with a stream of binary data segments each of which has a data length of M bits comprising a first, second, . . . , and M-th bits, M, N being integers, $N>2$, $M≥2$, and $N!≥2*(2^M)$, wherein each stream of binary data segment is corresponding to one of $2^M$ binary permutations of the first, second, . . . , and M-th bits;

wherein the N multi-level signals are configured such that each multi-level signals has N signal levels, and at the same time each multi-level signal has a signal level different from that of the other (N−1) multi-level signals, whereby the signal levels of the N multi-level signals have $P(N, N)=N!$ multi-level permutations; and wherein the encoding table is defined such that each of $2^M$ binary permutations of the data signal is mapped into a respective pair of multi-level permutations of the N! multi-level permutations of the N multi-level signals, wherein each signal level in one of the respective pair of multi-level permutations, named as an odd multi-level permutation, is opposite to its corresponding signal level in the other of the respective pair of multi-level permutations, named as an even multi-level permutation;

(b) transmitting the stream of binary data segments in the form of the N multi-level signals simultaneously and respectively through the N multi-level data transmission channels such that when a binary data segment occurs in a (2K+1)-th time, the odd multi-level permutation of its respective pair of multi-level permutations is transmitted, when the binary data segment occurs in a (2K)-th time, the odd multi-level permutation of its respective pair of multi-level permutations is transmitted, thereby achieving a DC balance, wherein K is an integer greater than or equal to zero; and (b) decoding the N multi-level signals to obtain the data signal.

19. The method of claim 18, wherein a cumulative signal level of the N multi-level signals is zero.

20. The method of claim 18, wherein the other $(N!−2^M)$ multi-level permutations of the P(N, N) multi-level permutations of the signal levels of the N multi-level signals are adapted as command codes.

21. The method of claim 18, wherein the decoding step comprise the step of comparing each two of the N multi-level signals transmitted through the two data transmission channels to obtain a respective bit of the M bits of each binary data segment of the data signal based on comparison between the two corresponding multi-level signals.

* * * * *